C. N. COLSTAD.
AIR PUMP FOR AUTOMOBILES.
APPLICATION FILED DEC. 18, 1913.
1,100,056.
Patented June 16, 1914.
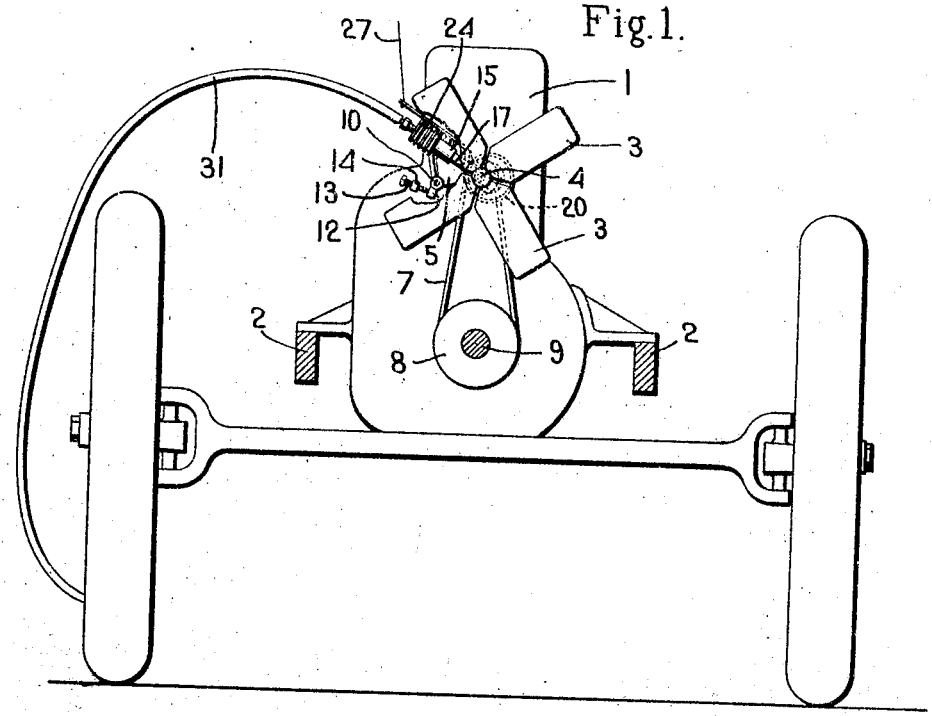
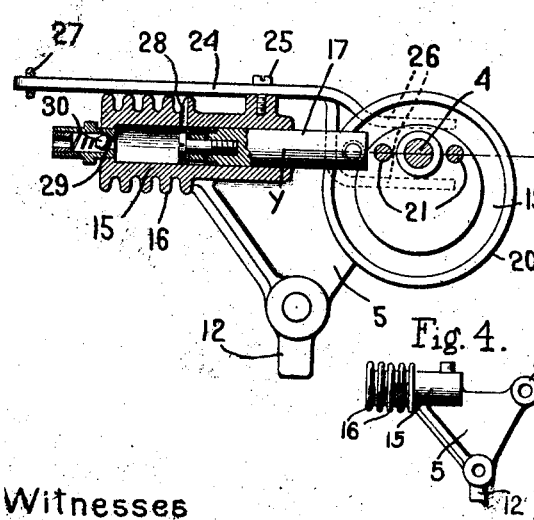
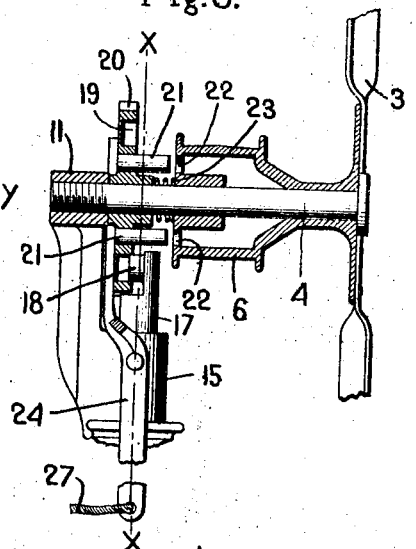
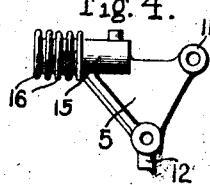
Witnesses
J. Morrill Fuller
William E. Gagen
Inventor.
Charles N. Colstad,
by Heard Smith & Tennant
Attys.

UNITED STATES PATENT OFFICE.

CHARLES N. COLSTAD, OF ATLANTIC, MASSACHUSETTS.

AIR-PUMP FOR AUTOMOBILES.

1,100,056.  Specification of Letters Patent.  Patented June 16, 1914.

Application filed December 18, 1913. Serial No. 807,550.

*To all whom it may concern:*

Be it known that I, CHARLES N. COLSTAD, a citizen of the United States, residing at Atlantic, county of Norfolk, State of Massachusetts, have invented an Improvement in Air-Pumps for Automobiles, of which the following description, in connection with the accompanying drawing, is a specification, like characters on the drawing representing like parts.

This invention relates to an air pump for automobiles to be used for pumping up the pneumatic tires and particularly to air pumps for such automobiles as use a fan-cooled engine.

The objects of the invention are to provide a novel construction in which the pump is sustained by and associated with the fan-supporting bracket thereby making a very simple construction which involves few extra parts, and also to provide a construction which can be readily adapted to any automobile having a fan-cooled engine without necessitating any change in the construction of the parts other than that of the fan-supporting bracket, and further to provide other novel features, all as will be more fully hereinafter described and then pointed out in the appended claims.

Referring to the drawings wherein I have illustrated a selected embodiment of my invention, Figure 1 is a more or less diagrammatic view showing the front part of a fan-cooled automobile engine and part of the chassis and running gear of an automobile. Fig. 2 is a section through the pump and fan-supporting bracket on substantially the line x—x, Fig. 3; Fig. 3 is a section on the line y—y, Fig. 2; Fig. 4 is a view of the combined fan-supporting bracket and pump cylinder.

I have shown at 1 in outline a fan-cooled internal combustion engine mounted on the chassis 2 of an automobile, and at 3 I have shown the engine-cooling fan. While my invention is applicable to any fan-cooled engine, I have chosen to show it herein as embodied in a construction wherein the fan 3 is mounted on a fan-supporting shaft 4 that is carried by a bracket 5 secured to the engine, the fan having rigid therewith a driving pulley 6 which is operated by a belt 7 from a pulley 8 on the engine shaft 9. This particular construction of air-cooled engine is very commonly used and forms no part of my present invention.

In embodying my invention in a device of this nature, I associate an air-pump with the fan-supporting bracket 5 and provide for operating the pump from the fan-driving mechanism. In the preferred embodiment of my invention the pump cylinder is made integral with the bracket 5 and the pump piston is operated from a cam member which is adapted to be clutched to or unclutched from the driving pulley 6.

The fan-supporting bracket 5 is shown as mounted on a stud 10 secured to the engine and the fan-supporting shaft 4 is secured in the portion 11 of the bracket. In the present embodiment of my invention the fan-supporting shaft is non-rotary and is in the form of a stud or pin screwed into the bracket. The bracket 5 is also provided with a lug 12 which is acted on by an adjusting screw 13 that has screw-threaded engagement with a projection 14 carried by the engine frame, the object of the screw 13 being to provide for shifting the bracket 5 about the stud 10 thereby to tighten the belt 7.

In the illustrated embodiment of my invention, this bracket 5 has cast integral therewith a pump cylinder 15, said cylinder preferably being provided with heat-radiating ribs 16 which will assist in dissipating the heat of compression. 17 is a pump piston of any suitable construction which operates in the cylinder 15. This piston is provided at its end with a pin or projection 18 which operates in a cam groove 19 formed in a piston-driving member 20 that is loosely mounted on the shaft 4. This piston-driving member 20 is adapted to be clutched to the fan pulley 6, and for this purpose said member 20 is arranged to slide longitudinally of the shaft 4 and is provided with clutch pins or projections 21 that are adapted to enter apertures or recesses 22 formed in the end of the fan pulley.

A spring 23 is placed between the piston-driving member 20 and the fan pulley, which spring encircles the shaft 4 and tends normally to keep the clutch disengaged, as shown in Fig. 3. The piston-driving member 20 is moved longitudinally of the shaft and into operative engagement with the pulley 6 by means of an actuating member 24 in the form of a lever pivoted to the pump cylinder at 25 and having a forked end 26 that embraces the shaft 4 and is adapted to engage the opposite side of the member 20 from that acted upon by the spring 23. This actuating member 24 will have a suitable link, or connection 27 secured to the end thereof which leads to a convenient point from which the chauffeur may operate it.

The pump cylinder is shown as having an inlet port 28 and an outlet port 29 controlled by a check valve 30, and the outlet port of said pump communicates with a flexible tube 31 which may be connected to the valve of any of the pneumatic tires.

Under normal conditions when it is not necessary to use the pump the parts are in the position shown in Fig. 3, in which position the fan will run freely on its shaft without affecting the pump. Whenever the pump is to be operated the actuating member 24 is operated through the connection 27 thereby to shift the piston-driving member 20 to the right Fig. 3 and into position to cause it to be clutched to the fan pulley 6, and as soon as this occurs the rotation of the fan will be communicated to the member 20 and thus the pump piston will be operated. The length of the pin 18 is such that it always has operative engagement in the cam groove 19 even when the clutch is disengaged, and the groove 19 is deep enough to permit of the necessary movement of the member 20 to cause it to be clutched to the fan pulley 6.

It will be observed that my invention adds very little to the mechanism now already in use in a fan-cooled engine, it being merely necessary to provide a bracket having the pump cylinder sustained thereby, and to place the piston-driving member 20 on the fan shaft. The fan-supporting bracket 5 is readily removed from the engine and any internal combustion engine can be equipped with my invention by merely removing the fan-supporting bracket with which the engine was originally equipped and substituting for it a new bracket having my pump associated therewith. This can be done at a very small expense and with a small expenditure of labor.

As stated above, my invention is applicable to any internal combustion engine whether of the particular type herein shown or not. I, therefore, do not wish to be limited to the constructional features herein illustrated.

Having fully described my invention, what I claim as new and desire to secure by Letters Patent is:

1. The combination with an internal combustion engine, of a fan-supporting bracket sustained thereby, an engine-cooling fan supported by said bracket, engine-operated fan-driving mechanism, said bracket having a pump cylinder formed as an integral part thereof, a pump piston operating in said cylinder, and means to operate the piston from the fan-driving mechanism.

2. The combination with an internal combustion engine, of a fan-supporting bracket sustained thereby, an engine-cooling fan supported by said bracket, engine-operated fan-driving mechanism, a pump cylinder sustained by the bracket, a pump piston operating in the cylinder, and means to actuate the piston from the fan-driving mechanism.

3. The combination with an internal combustion engine, of a fan-supporting bracket sustained thereby, an engine-cooling fan supported by said bracket, engine-operated fan-driving mechanism, said bracket having a pump cylinder formed as an integral part thereof, a pump piston operating in said cylinder, a piston-actuating member sustained by the bracket, and means to couple said member to the fan.

4. In a device of the class described, the combination with a fan-supporting bracket, of a fan shaft sustained thereby, a fan rotatably mounted on said shaft, a driving pulley for operating the fan, said bracket having formed as an integral part thereof a pump cylinder, a pump piston operating in said cylinder, a piston-driving member loosely mounted on said shaft, and means to couple said piston-driving member to said pulley.

In testimony whereof I have signed my name to this specification, in the presence of two subscribing witnesses.

CHARLES N. COLSTAD.

Witnesses:
 Louis C. Smith,
 Thomas J. Drummond.